Aug. 8, 1933.   C. H. SAMPSON   1,921,264
CLUTCH
Filed March 26, 1929   2 Sheets-Sheet 1
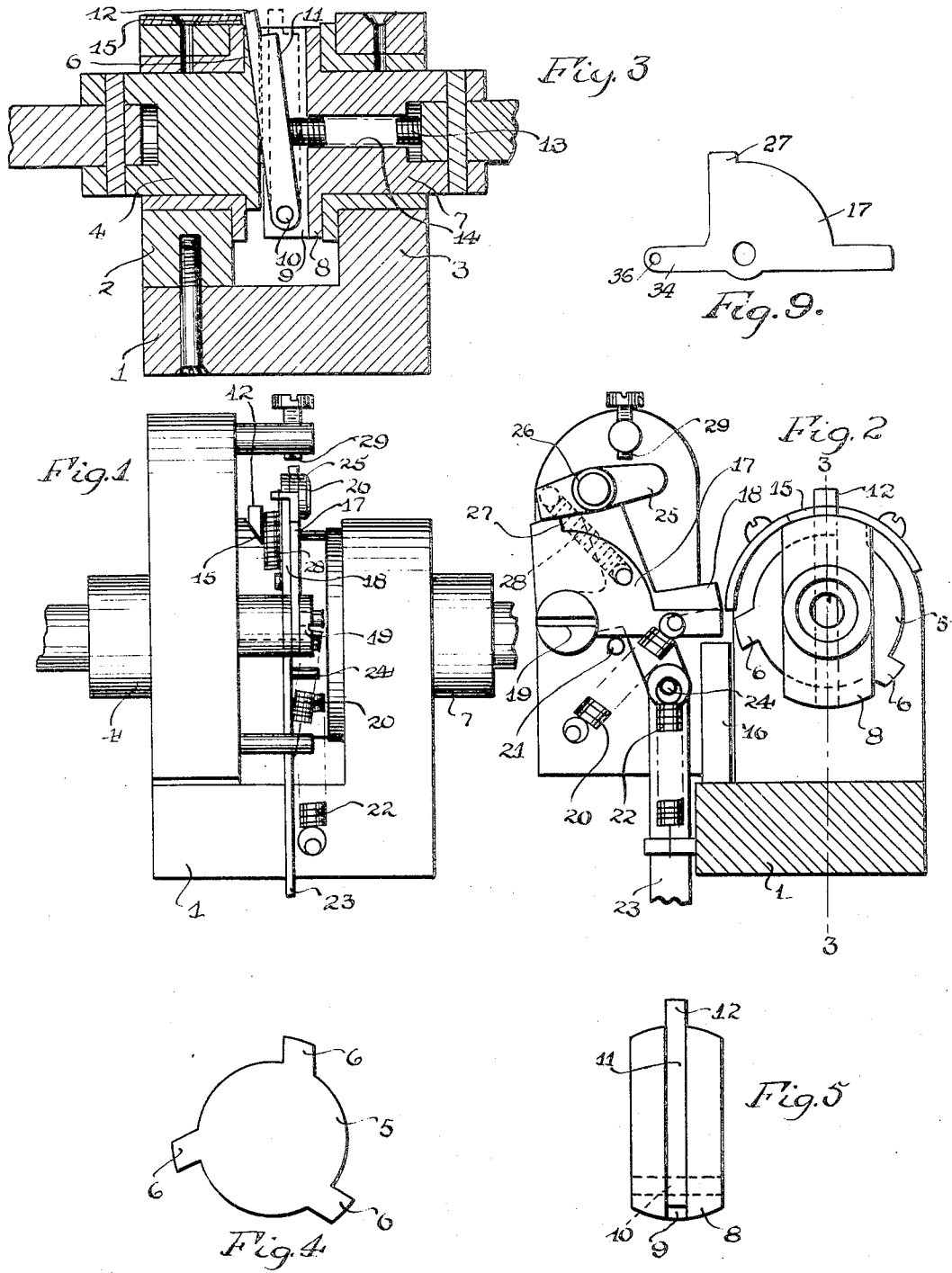
INVENTOR
Charles H. Sampson
BY
his ATTORNEY Aug. 8, 1933.                C. H. SAMPSON                1,921,264
                                  CLUTCH
                           Filed March 26, 1929         2 Sheets-Sheet 2
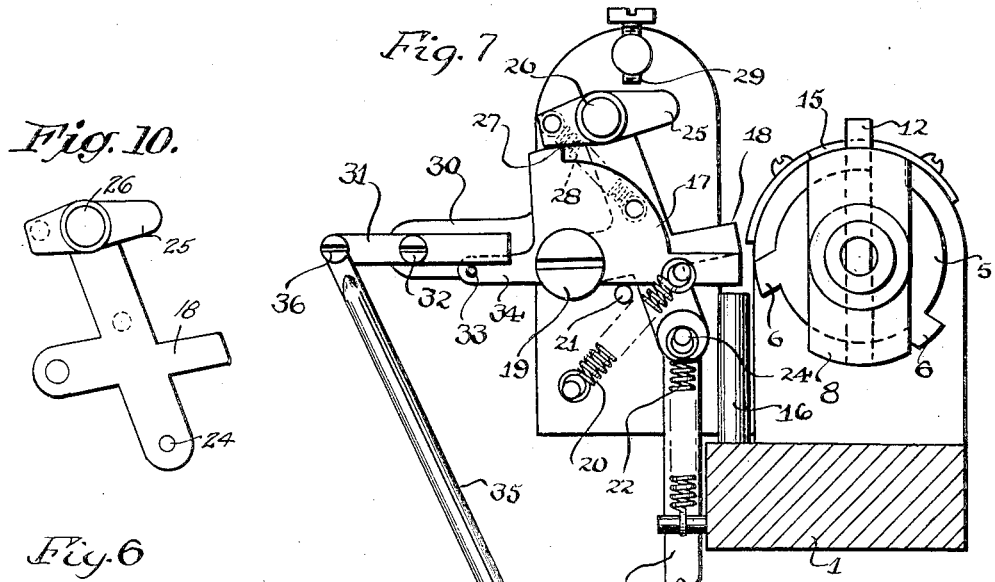
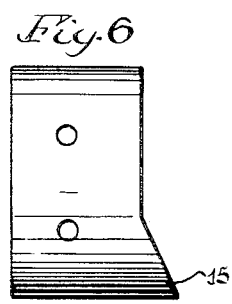
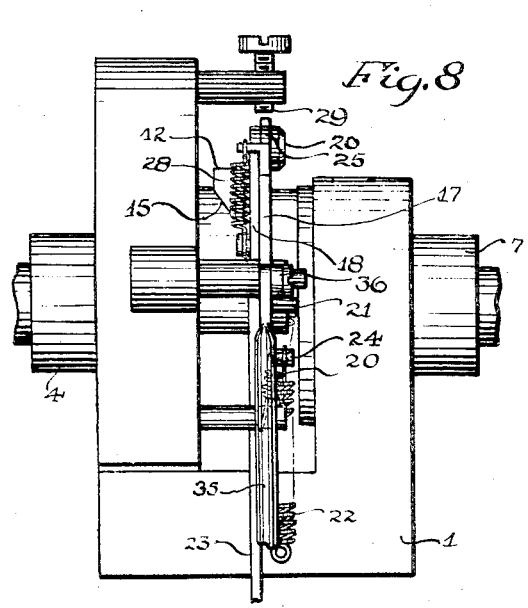
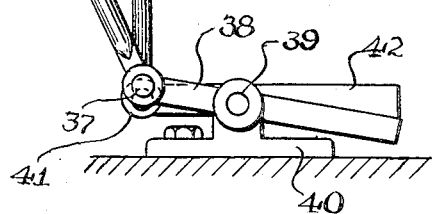
INVENTOR
Charles H. Sampson
BY
his ATTORNEY Patented Aug. 8, 1933

1,921,264

UNITED STATES PATENT OFFICE 1,921,264

CLUTCH

Charles H. Sampson, Rochester, N. Y., assignor to Sampson Permagraph Company Inc., Rochester, N. Y., a Corporation of New York Application March 26, 1929. Serial No. 350,114

3 Claims. (Cl. 192—148)

The present invention relates to clutches and an object thereof is to provide a clutch which positively insures the breaking of the clutch action after one revolution of the clutch, notwithstanding the speed of rotation of the clutch. Another object of the invention is to provide a clutch having a driven member so controllable as to obtain either a single rotation or a continuous rotation.

To these and other ends, the invention consists of certain parts and combinations of parts, all of which will be hereinafter described: the novel features being pointed out in the appended claims.

In the drawings:

Fig. 1 is a view of one embodiment of the clutch in elevation;

Fig. 2 is a side view of the clutch;

Fig. 3 is a section on the line 3—3, Fig. 2;

Fig. 4 is a detail view of one of the clutch elements;

Fig. 5 is a detail view of another of the clutch elements;

Fig. 6 is a plan view of the shifting cam;

Fig. 7 is a view similar to Fig. 2 showing another embodiment of the invention; and Fig. 8 is a view similar to Fig. 1 of the embodiment shown in Fig. 7.

Fig. 9 is a detail view of the detent 17 and Fig. 10 is a detail view of the detent 18.

In both illustrated embodiments of the invention, 1 indicates a supporting frame having two bearings 2 and 3 projecting upwardly therefrom. In the bearing 2 is journalled a head 4 provided with a clutch element in the form of a flange 5 having projecting lugs or abutments 6. In the bearing 3 is journalled a head 7 formed with an enlargement 8 provided with a slot 9 in which is pivoted at 10 a movable clutch element 11 which projects at 12 from one end of the enlargement. A helical spring 13 is arranged in an axial bore 14 in the head 7 and acts on the clutch element 11 in a direction to move said element normally toward the other element of the clutch so as to engage with one of the abutments 6 in order that both elements may move together, the element 4, in this instance, being the driving member and the element 11 being the driven member.

With the end in view of moving the clutch element 11 out of engagement with an abutment 6, a shifting means is provided preferably in the form of a cam surface 15 fixed, in this instance, to the bearing 2 of the driving element of the clutch and arranged to engage the projecting portion 12 of the movable element 11 as the latter turns so as to shift the movable element into its slot and out of the path of the abutments.

In order to stop the turning of the driven clutch element, a fixed stop or abutment 16 is arranged in the path of the projection 12 of the clutch element 11, being beyond but in slightly spaced relation to the end of the shifting cam 15 so that as the part 12 passes from the cam it comes to a stop against the abutment 16.

As the spring 13 is acting on the clutch element 11, the latter has a tendency to shift into engagement with the abutments 6 after passing from the cam 15, and to prevent this movement until it is desired to reestablish connection between the two clutch elements, a holding means is provided for holding the member 11 against movement on the stop 16. This holding means, in this instance, comprises two detents 17 and 18 having a common pivot 19 and mounted to one side of the axis of turning of the clutch parallel with said axis. The two detents swing side by side so that either may close the space between the end of the cam 15 and the abutment 16. A spring 20 acts on the detent 17 normally to hold the latter in detaining position against a stop 21, whereas a spring 22 acts on the detent 18 normally to hold the latter toward the stop 16.

Movement of the detents 17 and 18 is effected, in this instance, through an operator 23 in the form of a push bar pivoted at 24 to the detent 18. The detent 17 is moved through a breakable connection with the detent 18 comprising, in this instance, a pawl 25 pivoted at 26 to the detent 18 and normally held in engagement with a shoulder 27 on the detent 17 by a spring 28. In this way, manipulation of treadle 42 by depressing it results in the release of both detents 17 and 18 and moves them away from the abutment or stop 16 simultaneously. The pawl 25 engages an adjustable stop 29 in its movement and is shifted out of connection with the abutment 27 on the detent 17 so that the spring 20 returns the detent 17 into detaining position. This occurs before the operator 23 releases the detent 18. The operator is now released and the detent by means of the spring 22 is shifted to its normal detaining position and the end of the pawl drops behind the shoulder 27 and is ready to again operate the detent 17. This quick action of the detent 17 is desirable as the clutch is rotating at a high speed and some detaining means must be present at the stop 16 or the spring 13 will again shift the clutch element 11 into engagement with an abutment 6 immediately that the end of the cam 15 is reached. This construction positively insures that the clutch will make but one rotation.

In the embodiment of the invention shown in Figs. 7 and 8, the parts are the same except that means is provided for obtaining in addition to a single rotation of the driven member a continuous rotation of the driven member. This is effected by providing a bracket arm 30 on the bearing 3 and pivoting to said arm a double armed lever 31 at 32. The forward arm of the lever 31 is adapted to cooperate with an abutment 33 on an arm 34 extended rearwardly from the detent 17, thus providing a lost motion connection. The other arm of the lever 31 has a pitman 35 pivoted thereto at 36, said pitman having its other end pivoted at 37 to a treadle 38 which is pivoted at 39 to a base member 40. The operator 23 is in the form of a pitman pivoted at its lower end at 41 to a treadle 42 which is also pivoted at 39 to the base member 40. The normal positions of the two treadles are side by side so that one foot of the user may engage both treadles simultaneously, the outer end of the treadle 42 being in a higher plane than the outer end of the treadle 38 so that the treadle 42 may be depressed by the foot without depressing the treadle 38 in order that the clutch may be controlled through the detent 18 in order to effect only a single rotation of the driven member of the clutch. A further depression of the foot also controls the detent 17 to hold the latter in an inoperative position in order that the driven member of the clutch may rotate continuously until the treadle 38 is released. This arrangement is desirable where it is wished to operate a part either one or a plurality of successive times at will, as for instance, the needle of a sewing machine.

What I claim as my invention and desire to secure by Letters Patent is:

1. In a clutch, the combination with a driving member and a driven member having a movable part with a normal tendency to move into connection with the driving member, of a shifter arranged in the path of travel of the movable part to move the latter to break connection with the driving member, a stop cooperating with the movable part when out of connection with the driving member to stop the turning of the driven element, said stop being spaced from the shifter, and movable means arranged between the shifter and the stop for holding the movable part against movement into connection with the driving member, said means comprising two detents each having a normal tendency to lie in holding position, means for shifting one of the detents away from holding positions, a breakable connection between the detents causing them to travel away from detaining position, and means for breaking said connection before the first mentioned detent is released by its shifting means.

2. In a clutch, the combination with a driving member, a driven member, and means for effecting connection between the driving member and the driven member, of two controlling mechanisms for said means one for effecting a single rotation of the driven member and the other for effecting a continuous rotation of the driven member, said controlling mechanism having two treadles arranged side by side in two different angular positions, the treadle controlling the single rotation having an angular foot engaging position in advance of the foot engaging position of the other treadle so that it is operated in advance of said other treadle by moving it parallel to the foot engaging position of the treadle for effecting the continuous rotation of the driven member to permit the foot of a user to shift from one treadle to the other.

3. In a clutch, the combination with a driving member, a driven member, and means for effecting connection between said driving and driven member, of two detents adapted to hold said means collectively and independently from establishing said connection, separate means for operating said detents to move them from detaining positions, a breakable connection between the detents for effecting the movement of one through the other away from detaining position, and means for effecting such breaking after the detents have been moved collectively one through the other away from detaining position to permit one of the detents to return to detaining position.

CHARLES H. SAMPSON.